United States Patent [19]

Elliott et al.

[11] Patent Number: 5,421,275
[45] Date of Patent: Jun. 6, 1995

[54] METHOD AND APPARATUS FOR REDUCING MIXED WASTE

[75] Inventors: Michael L. Elliott, Kennewick; Joseph M. Perez, Jr.; Chris C. Chapman, both of Richland; Richard D. Peters, Pasco, all of Wash.

[73] Assignee: Battelle Memorial Institute, Richland, Wash.

[21] Appl. No.: 242,214

[22] Filed: May 13, 1994

[51] Int. Cl.⁶ .................................................. F23G 5/00
[52] U.S. Cl. ........................................ 110/346; 110/242; 110/256; 110/229
[58] Field of Search .............. 110/235, 242, 256, 346, 110/229

[56] References Cited

U.S. PATENT DOCUMENTS

| | | | |
|---|---|---|---|
| 3,801,082 | 4/1974 | Anderson | 110/254 |
| 4,732,091 | 3/1988 | Gould | 110/229 |
| 5,311,830 | 5/1994 | Kiss | 110/256 X |

OTHER PUBLICATIONS

H. Thomas Blair, "In-Can Melting Process and Equipment Development from 1974 to 1978"; PNL-2925, Aug. 1979, 154 pp.

Primary Examiner—Denise L. Gromada
Attorney, Agent, or Firm—Paul W. Zimmerman

[57] ABSTRACT

The present invention is a method and apparatus for in-can waste reduction. The method is mixing waste with combustible material prior to placing the waste into a waste reduction vessel. The combustible portion is ignited, thereby reducing combustible material to ash and non-combustible material to a slag. Further combustion or heating may be used to sinter or melt the ash. The apparatus is a waste reduction vessel having receiving canister connection means on a first end, and a waste/combustible mixture inlet on a second end. An oxygen supply is provided to support combustion of the combustible mixture.

15 Claims, 3 Drawing Sheets

METHOD AND APPARATUS FOR REDUCING MIXED WASTE

FIELD OF THE INVENTION

The present invention relates generally to a method and apparatus for reducing and packaging mixed waste. More specifically, the invention is a method and apparatus for reducing and packaging mixed waste by combustion within a waste container.

BACKGROUND OF THE INVENTION

Disposal of radioactive and hazardous wastes has become more costly as environmental regulations limit disposal options. It is recognized that waste reduction and packaging can be combined as has been done for "in-can" melters. However, "in-can" melters are specifically used for non-combustible waste and exhibit diseconomies of scale in terms of equipment and operation costs.

In-can melters described in *In-Can Melting Process and Equipment Development From 1974 to 1978*, PNL-2925, Pacific Northwest Laboratory, Richland, Wash., are operated by filling a canister with solid non-combustible wastes, then placing a clamshell shaped heating unit around the canister. The canister is heated to a temperature that melts the solid wastes. More wastes may be added to fill the canister. In order to fill a large number of canisters, either many clamshell heaters are needed (high equipment cost) for parallel filling of canisters, or many man-years of labor are needed (high operation cost) for serial filling of canisters. In addition, the heating and cooling of a relatively small clamshell heater results in significant heat losses, further exacerbating the operational costs.

Not until the present invention has there been the possibility of in-can waste reduction and packaging with parallel high throughput and modest equipment cost.

It is an object of the present invention to provide an in-can waste reduction method and apparatus using in-can combustion of the waste.

SUMMARY OF THE INVENTION

The present invention is a method and apparatus for in-can waste reduction. The method is mixing waste with combustible material prior to placing the waste into a waste reduction vessel. The combustible portion is ignited, thereby reducing combustible material to ash and non-combustible material to a slag. Further combustion or heating may be used to sinter or melt the ash.

The apparatus is a waste reduction vessel having receiving canister connection on a first end, and a waste/combustible mixture inlet on a second end. An oxygen supply is provided to support combustion of the combustible mixture.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
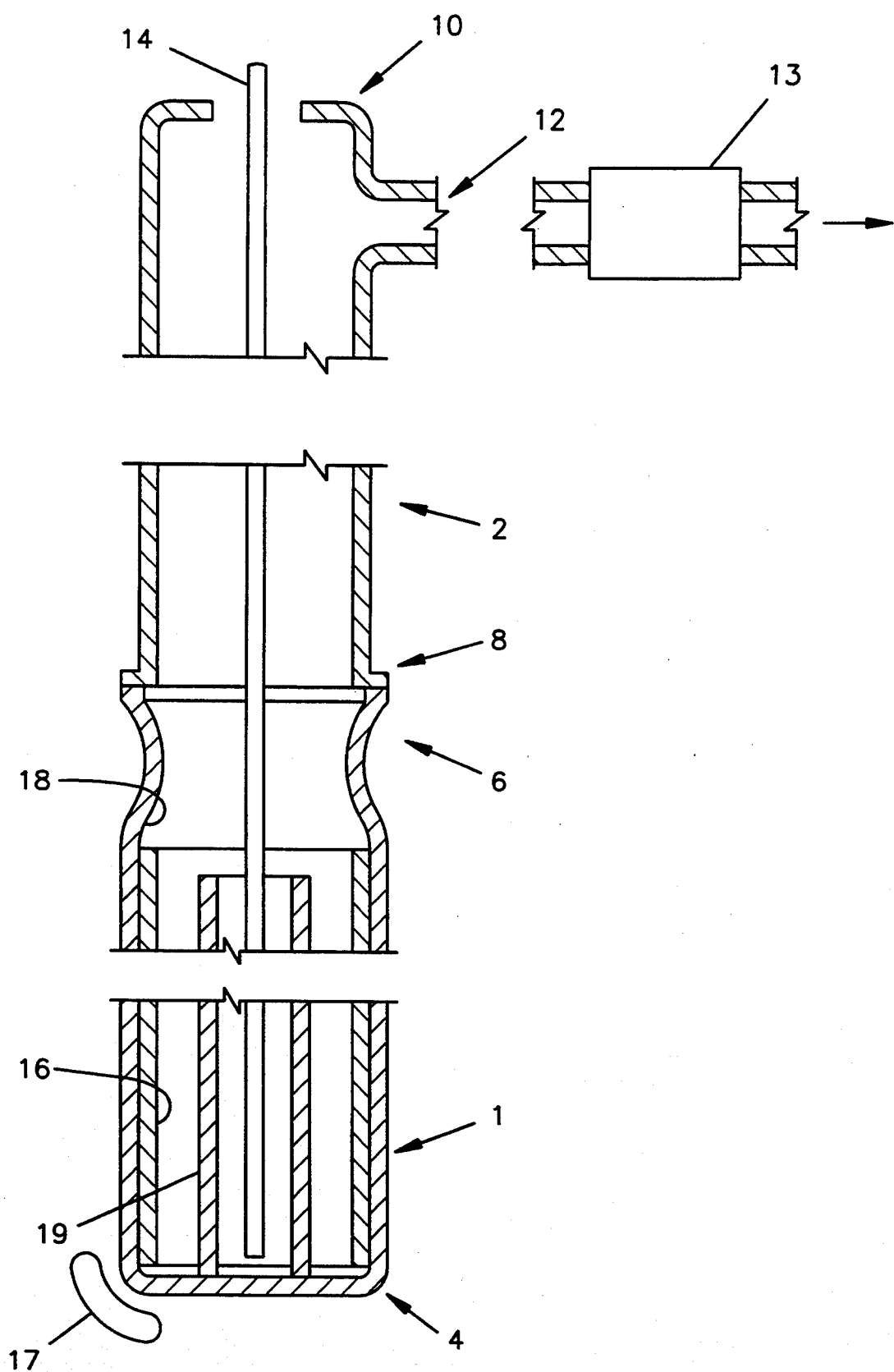
FIG. 1 is a sectional view of a preferred embodiment of the apparatus of the present invention.

The apparatus of the present invention depicted in FIG. 1 has two main components; a canister (1), and a waste charge vessel (2). The canister (1) has a closed end (4) and an open end (6). The waste charge vessel (2) has a first end (8) open and sealably connectable with the canister open end (6), a second end (10) open for receiving a waste charge (not shown), and an off-gas exhaust port (12). Also shown is a pump (13) for drawing gases from the waste charge vessel (2) through the off-gas exhaust port (12).

The canister (1) may be constructed of any material capable of withstanding temperatures necessary to combust organic portion(s) of the waste charge and melt, and oxidize or chemically reduce inorganic portion(s) of the waste charge. Materials of construction include but are not limited to ceramic, steel, stainless steel, and other alloys. Preferred material is an alloy of stainless steel known as Inconel because it is resistant to spalling at the necessary temperatures.

The waste charge may be any mixed waste and is preferably solid waste. The waste charge is further preferably a combination of a combustible portion that may be an organic portion and a non-combustible portion that may be a non-organic portion. The waste charge can have differing sizes of particles, chips, or larger elements so long as they fit through the waste charge vessel (2) and into the canister (1). The waste charge may contain moisture, but it is preferred that moisture content be small to reduce the energy consumed in evaporation. The waste charge may have a solids-to-moisture ratio from about 1:2 by weight to totally dry. It is preferred that the solids-to-moisture ratio range from about 2:1 to totally dry.

Equipment for processing raw waste into a waste charge may be necessary, including dewatering apparatus, spray calcining, air locks, or retort. However, this equipment is specific to the type and amount of raw waste to be processed into a waste charge.

There is also provided a supply of oxygen to the waste charge. The means includes but is not limited to mixing oxidizing compound(s) in the waste charge, or providing an oxygenation rod (14). The oxygenation rod (14) is preferably inserted from the top as shown or inserted from any other position. The oxygenation rod (14) may be a lance or hollow pipe through which air or other oxygen containing gas is sent to the waste charge, or it may be a solid or hollow rod of oxidizing material that is consumed during combustion.

An alternative embodiment oxygen supply to the waste charge is to provide oxidation material as in the oxidizing material rod, but in a form that fits within the canister (1). For example, the oxidizing material may be in the form of an annular or cylindrical ring (16) adjacent the inside (18) of the canister wall. Other geometric forms may be used as well, for example short lengths placed adjacent or away from the inside (18) of the canister wall and adjacent each other or spaced apart from each other.

A yet further embodiment provides for a source of glass forming materials either within the waste charge, or set within the canister in the form of geometric shapes (19). The presence of glass forming materials provides the opportunity to form a chemically durable glass containing waste components.

Finally, there is provided an igniter (17) for igniting combustible material within the waste charge. The igniter (17) may be any igniter, for example a spark generation source including but not limited to standard match, electric match, or flint and steel. The igniter (17) may be a heat source including but not limited to heat guns, torches, or frictional sources. The igniter (17) may be deployed internally or externally to the canister (1) or waste charge vessel (2), but is preferably deployed external to the canister (1) near the closed end (4).

Figure 2:
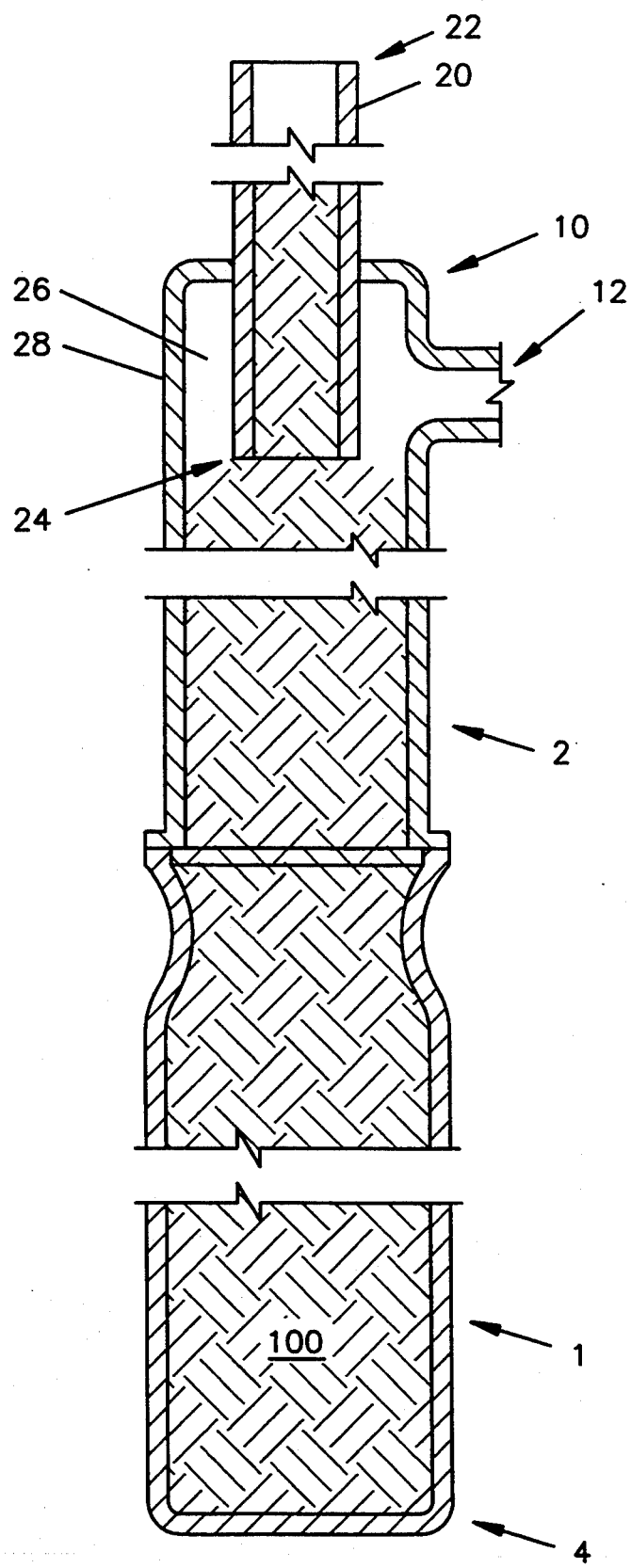
FIG. 2 is a sectional view of another preferred embodiment of the apparatus of the present invention.

In order to facilitate off-gas removal, a seal for sealing the second end (10) of the waste charge vessel (2) is employed. A preferred seal is shown in FIG. 2 as a chute (20) having a first open end (22) for receiving waste charge (100) and a second open end (24) for discharging waste charge (100) into the canister (1). The chute (20) is sealably attached, preferably welded, to the waste charge vessel (2). The second open end (24) extends below the off-gas exhaust port (12) so that waste charge (100) is precluded from plugging the off-gas exhaust port (12). Off-gas from combustion rises through the waste charge (100) and enters a plenum region (26) formed between the wall (28) of the waste charge vessel (2) and the chute (20), and is then drawn through the off-gas port (12).

Figure 3:
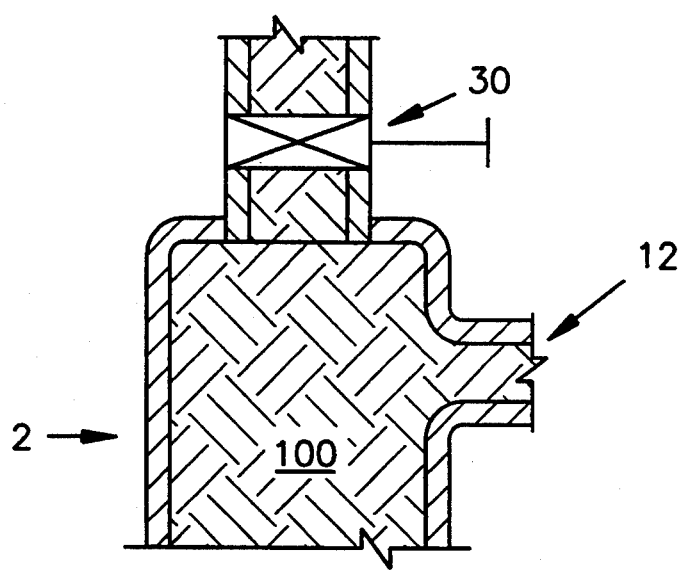
FIG. 3 is a sectional view of an alternative embodiment of the apparatus of the present invention.

An alternative seal is shown in FIG. 3 as a valve (30). The valve (30) may be any type of valve, but is preferably a knife-edged riser valve. The valve (30) may be actuated by any valve actuator including but not limited to hand actuation or remotely powered actuation, but is preferably remote power actuated. Although waste charge (100) extends past the off-gas exhaust port (12) off-gases are still drawn through the off-gas exhaust port (12) because of the sub atmospheric pressure therein.

In operation, a waste charge (100) is prepared by collecting waste and causing to be present therein combustible material in an amount sufficient to heat the waste above boiling of liquids present and above melting of solids having melting points below the melting point of the canister (1). The combustible material may be naturally present within the waste or may be added to uncombustible waste. The waste charge (100) may further contain oxidizing compound(s), including but not limited to iron oxides, for example $Fe_2O_3$, potassium manganates, for example $KMnO_4$, and calcium sulfates, for example $CaSO_4$.

Waste charge (100) not containing oxidizing compound(s) is poured into the second end (10) of the waste charge vessel (2) and rests on the closed end (4) of the canister (1). An oxidizing rod (14) is inserted, preferably prior to entry of the waste charge (100). A heat source is applied to the closed end (4) and the combustible material within the canister is ignited. As the combustible material burns, off-gases rise through the waste charge (100) raising the temperature of the waste charge (100) and escaping through the off-gas exhaust port (12). In the case of the oxidation rod (14) char is formed in the combustion zone near the closed end (4) with a pyrolysis zone above it, a heating zone above the pyrolysis zone and a drying zone above the heating zone as the off-gases exchange heat energy with the waste charge (100).

In the case of the oxidation rod (14) being an oxidation material, the oxidation material is consumed and the rod is lowered into the canister (1). In the case of the oxidation rod (14) being a lance, the lance is raised and lowered as necessary for continued combustion. As ash and char accumulate, the oxidation rod (14) is raised to keep the combustion zone at the bottom of the combustible portion of the waste charge (100).

Waste charge (100) containing oxidizing compounds is ignited near the closed end (4) of the canister (1). As char and ash are formed, the combustion zone propagates toward unburned combustion material and forming zones similar to those formed when an oxidation rod (14) is used.

A preferred method for reduction of waste has the steps of:

(a) sealably connecting an open end of a canister having a closed end and the open end to a first open end of a waste charge vessel (b) placing a waste charge through a second end of the waste charge vessel;

(c) providing oxygen to the waste charge;

(d) igniting a combustible portion of the waste charge; and (e) drawing gases from the waste charge vessel and providing a subatmospheric pressure therewithin. The method may be semi-continuous or batch. In the semi-continuous method, fresh waste charge is added to the waste charge vessel (2) as burning reduces volume and level of initial waste charge (100).

In the batch method, a volume or mass of waste charge (100) is completely burned before the next volume or mass of waste charge is poured into the waste charge vessel (2).

In any case, it is desirable to have sufficient combustion or add external heat to sinter or melt ash from combustion. There is also the possibility of maintaining the sintered or melted ash at a cool temperature while burning the next waste charge.

There are further at least two alternative batch methods. One batch method is to combust then sinter or melt ash with each batch. Another batch method is to combust to ash each batch until the canister (1) is full of ash, then apply additional combustion or external heat to sinter or melt the ash. Upon sintering or melting, additional canister volume would then be available for additional waste charge.

Additionally, a valve may be added to the canister permitting discharge of molten material to a secondary container.

CLOSURE

While a preferred embodiment and several alternative embodiments of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for reduction of a waste charge, comprising:

(a) a canister having a closed end and an open end;

(b) a waste charge vessel having a first end open and sealably connectable with the canister open end, the waste charge vessel further having a second end open for receiving a waste charge, the waste charge vessel further having an off-gas exhaust port;

(c) a seal for sealing the second end;

(d) an oxidizing material for providing oxygen to the waste charge; and (e) an igniter for igniting combustible material within the waste charge.

2. The apparatus as recited in claim 1, wherein the oxidizing material is mixed within the waste charge.

3. The apparatus as recited in claim 1, wherein the oxidizing material is in the form of a rod.

4. The apparatus as recited in claim 1, wherein the means for sealing is a valve connected to the second end.

5. The apparatus as recited in claim 1, wherein the means for igniting is an external heat source.

6. The apparatus as recited in claim 1, further comprising:

a pump for drawing gases from the waste charge vessel off-gas exhaust port and providing a sub-atmospheric pressure therein.

7. An apparatus for reduction of a waste charge, comprising:

(a) a canister having a closed end and an open end;

(b) a waste charge vessel having a first end open and sealably connectable with the canister open end, the waste charge vessel further having a second end open for receiving a waste charge, the waste charge vessel further having an off-gas exhaust port;

(c) a chute sealably connected to the second end and forming a plenum region between the chute and the wall of the waste charge vessel, the chute having a first end that extends below the off-gas exhaust port;

(d) an oxygen supply for providing oxygen to the waste charge; and (e) an igniter for igniting combustible material within the waste charge.

8. A method for reduction of a waste charge, comprising:

(a) sealably connecting an open end of a canister having a closed end and the open end to a first open end of a waste charge vessel;

(b) placing a waste charge through a second end of the waste charge vessel and sealing the second end;

(c) providing an oxidizing material to the waste charge; and (d) igniting a combustible portion of the waste charge.

9. The method as recited in claim 8, wherein the oxidizing material is a rod.

10. The method as recited in claim 8, wherein a first volume of waste charge is burned leaving an ash or char, and the ash or char is further sintered or melted followed by burning and sintering or melting in an additional volume of waste charge until the canister is filled with sintered or melted ash or char.

11. The method as recited in claim 8, wherein a first volume of waste charge is burned leaving an ash or char, then subsequent volumes of waste charge are burned to ash or char until the canister is filled with ash or char, then the ash or char is sintered or melted, followed by additional volumes of waste charge that are burned to ash or char and subsequently sintered or melted until the canister is filled with sintered or melted ash or char.

12. A method for reduction of a waste charge, comprising:

(a) sealably connecting an open end of a canister having a closed end and the open end to a first open end of a waste charge vessel;

(b) placing a waste charge through a second end of the waste charge vessel and sealing the second end;

(c) providing oxygen to the waste charge;

(d) igniting a combustible portion of the waste charge; and (e) providing a glass-forming material in the canister, thereby providing a chemically durable glass containing waste after combustion.

13. The method as recited in claim 12, wherein glass forming material is adjacent the inner surface of the canister.

14. An apparatus for reduction of a waste charge comprising:

(a) a canister having only one opening in an open end and a closed end;

(b) a waste charge vessel having a first end open and sealably connectable with the canister open end, the waste charge vessel further having a second end open for receiving a waste charge, the waste charge vessel further having an off-gas exhaust port;

(c) a seal for sealing the second end;

(d) an oxygen supply for providing oxygen to the waste charge; and (e) an igniter for igniting combustible material within the waste charge.

15. An apparatus for reduction of a waste charge, comprising:

(a) a canister having a closed end and an open end;

(b) a waste charge vessel having a first end open and sealably connectable with the canister open end, the waste charge vessel further having a second end open for receiving a waste charge, the waste charge vessel further having an off-gas exhaust port;

(c) a seal for sealing the second end;

(d) an oxygenation rod inserted through the open end and extending through the canister in proximity to the closed end for providing oxygen to the waste charge; and (e) an igniter for igniting combustible material within the waste charge.

* * * * *